(12) United States Patent
Miyake et al.

(10) Patent No.: US 6,461,772 B1
(45) Date of Patent: Oct. 8, 2002

US006461772B1

(54) BATTERY DIAPHRAGM

(75) Inventors: Shinichi Miyake, Osaka (JP);
Nobuyuki Tokuda, Osaka (JP)

(73) Assignees: Sumitomo Electric Industries, Ltd., Osaka (JP); Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 09/460,808

(22) Filed: Dec. 14, 1999

(30) Foreign Application Priority Data

Dec. 14, 1998 (JP) ...................................... 10-355100(P)
Nov. 25, 1999 (JP) .......................................... 11-333617

(51) Int. Cl.$^7$ ............................................... H01M 2/16
(52) U.S. Cl. ...................... 429/247; 429/245; 429/246; 429/249; 429/253; 429/254
(58) Field of Search ................................ 429/245, 246, 429/247, 249, 253, 254

(56) References Cited

U.S. PATENT DOCUMENTS

| | | | | |
|---|---|---|---|---|
| 4,127,706 A | * | 11/1978 | Martin et al. ................ | 429/122 |
| 4,405,700 A | | 9/1983 | Rampel | |
| 4,414,090 A | | 11/1983 | D'Agostino et al. | |
| 4,550,064 A | | 10/1985 | Yen et al. | |
| 5,830,603 A | | 11/1998 | Oka et al. | |
| 5,858,264 A | * | 1/1999 | Ichino et al. .............. | 252/62.2 |
| 5,962,161 A | | 10/1999 | Zucker | |

FOREIGN PATENT DOCUMENTS

| | | |
|---|---|---|
| GB | 856327 | 12/1960 |
| JP | 42-13560 | 8/1967 |
| JP | 55110654 | 7/1980 |
| JP | 57059931 | 4/1982 |
| JP | 60160560 | 8/1985 |
| JP | 01038448 | 2/1989 |
| JP | 2-68146 | 3/1990 |
| JP | 6-271688 | 9/1994 |
| JP | 7-122257 | 5/1995 |
| JP | 8-96788 | 4/1996 |
| WO | WO 98/31060 | 7/1998 |

OTHER PUBLICATIONS

European Examination Report dated Nov. 16, 2000.
"Modification of Anion–Exchange Membranes for Vanadium Redox Flow Battery Applications" by T. Mohammadi et al., Journal of Power Sources, vol. 63, 1996, pp. 179–186.

\* cited by examiner

*Primary Examiner*—Carol Chaney
*Assistant Examiner*—Dah Wei Yuan
(74) *Attorney, Agent, or Firm*—McDermott, Will & Emery

(57) ABSTRACT

A battery diaphragm having superior chemical resistance, low resistance, superior ion selective permeability and high mechanical strength is provided. The battery diaphragm is formed of a composite film including a complex of a porous base substrate (A) with a crosslinked polymer ($B_1$) containing repeated units of a vinyl heterocyclic compound having at least two hydrophilic groups. Alternatively, the battery diaphragm is formed of a composite film including a complex of a porous base substrate (A) with a crosslinked polymer (B2) containing repeated units of a vinyl compound each having a functional group, and thereafter decomposing part of the functional groups. Alternatively, the battery diaphragm is formed of a composite film including a complex of a porous base substrate (A) with a crosslinked polymer (B3) containing repeated units of a vinyl compound each having a functional group, wherein the complex of the porous base substrate (A) with the crosslinked polymer is prepared by impregnating a porous structure of the porous base substrate (A) with a monomer mixture containing a crosslinking momomer and the vinyl compound having functional groups, and thereafter causing photopolymerization to generate the crosslinked polymer (B3) in the porous structure.

19 Claims, No Drawings

BATTERY DIAPHRAGM

BACKGROUND OF THE INVENTION

1. Field of the Invention

The present invention relates to a battery diaphragm suitable as a diaphragm (separator) of a secondary battery such as an alkaline battery and a redox flow battery. More specifically, the present invention relates to a battery diaphragm having superior chemical resistance, mechanical strength and ion selective permeability as well as low resistance, formed of a composite film including a complex of a porous base substrate with a crosslinked polymer functioning as ion exchange resin.

2. Description of the Background Art

In a battery, a diaphragm is used to prevent short-circuit between positive and negative electrodes. Generally, a battery diaphragm is required to have electrical insulation and resistance to electrolyte (chemical resistance). Additionally, it is required that the diaphragm is poromeric allowing good permeation of the electrolyte, and that the electrolyte contained in the diaphragm has low electrical resistance. Further, the battery diaphragm is also required to have heat resistance and mechanical strength high enough to withstand physical variation of active material associated with charging/discharging operations.

Recently, an ion exchange membrane has come to be used as a diaphragm for separating positive electrolyte and negative electrolyte from each other in a secondary battery such as an alkaline battery or a redox flow battery. Conventional ion exchange membrane applied to the battery diaphragm includes, for example, an ion exchange membrane having an anion group or a cation group introduced to divinylbenzene-styrene copolymer, an ion exchange membrane of divinylbenzene-vinylpyridine copolymer adapted to have quarternary pyridinium group, and an anion-exchange membrane having chloromethylated aromatic polysulfone polymer crosslinked by polyamine (Japanese Patent Laying-Open No. 2-68146).

Though such an ion exchange membrane has superior chemical resistance, heat resistance and ion selective permeability, the membrane does not have sufficient mechanical strength by itself. Insufficient mechanical strength of the ion exchange membrane hinders reduction in thickness of the membrane, and hence, it is difficult to lower film resistance. When the membrane is reinforced by other material, it also becomes difficult to lower film resistance.

Japanese Patent Laying-Open No. 6-271688 proposes an anion exchange membrane having a multilayered structure of polyolefin or polyfluorolefin porous film subjected to hydrophilization and an anion exchange membrane of chloromethylated aromatic polysulfonate type polymer aminated by monoamine and crosslinked by polyamine. It is described that the multilayered anion exchange membrane has superior corrosion resistance, high ion permeability and mechanical strength as a thin film of ion exchange membrane is provided on a porous support body having high mechanical strength.

The multilayered anion exchange membrane, however, unavoidably suffers from the problem of peeling of the layers at the interface of adhesion, as it has two-layered structure having the ion-exchange membrane and the porous film adhered with each other. A diaphragm for a secondary battery such as a redox flow battery or an alkaline battery employing an alkali electrolyte or a liquid active material must have high chemical resistance and mechanical strength. When the ion exchange membrane having the multilayered structure is used as the diaphragm of a secondary battery, the chemical resistance and the mechanical strength at the adhering portion are not sufficient, and therefore the membrane is prone to layer peeling.

SUMMARY OF THE INVENTION

An object of the present invention is to provide a battery diaphragm having superior chemical resistance, low resistance, superior ion selective permeability and high mechanical strength.

As a result of intensive study to overcome the problems of the prior art described above, the inventors of the present invention have attained a battery diaphragm formed of a composite film including a complex of a crosslinked polymer containing repeated units of vinyl heterocyclic compound having two or more hydrophilic groups. Preferably, the battery diaphragm in accordance with the present invention can be obtained by impregnating a porous structure of a porous base substrate with a monomer mixture containing crosslinking monomer and vinyl heterocyclic compound with two or more hydrophilic groups and causing polymerization to generate crosslinked polymer in the porous structure.

As a monomer mixture containing vinyl heterocyclic compound having two or more hydrophilic groups such as 1-vinyl imidazole, a crosslinking monomer such as divinyl benzene and a monomer which allows co-polymerization as needed is used, it becomes possible to increase degree of crosslinking without reducing hydrophilic groups, whereby highly balanced ion permeability and low resistance can be attained. Further, since the crosslinked polymer as the ion exchange resin is firmly bonded within the porous structure of the porous base substrate, the problem of layer peeling or the like can be prevented. When polytetrafluoroethylene porous film is used as the porous base substrate, a battery diaphragm having yet higher heat resistance, chemical resistance, ion selectivity, low resistance and high mechanical strength can be obtained.

As a result of intensive study to overcome the problems of the prior art described above, the inventors of the present invention have attained a battery diaphragm formed of a composite film including a complex of a porous base substrate with a crosslinked polymer containing repeated units of vinyl compound each having a functional group and thereafter decomposing part of the functional groups. Preferably, the battery diaphragm in accordance with the present invention can be obtained by impregnating a porous structure of a porous base substrate with a monomer mixture containing a vinyl compound having functional groups and crosslinking monomer, causing polymerization to generate crosslinked polymer in the porous structure, and thereafter decomposing part of the functional groups.

As a vinyl compound having an amon-exchange group such as 4-vinylpyridine, a vinyl compound having a hydrolyzable functional group such as vinyl acetate, vinyl propionate or vinyl-n-butyrate, and a crosslinking monomer such as divinyl benzene are used as the monomer mixture, first, degree of crosslinking can be increased by co-polymerization and, secondary, by decomposition of the functional group such as the acetate group, propionate group and n-butyrate group, hydrophilicity can be improved and spaces are formed in the crosslinked polymer to increase the amount of water molecules existing therein. Accordingly, highly balanced ion permeability and low resistance can be attained. Further, since crosslinked polymer as the ion exchange resin is firmly bonded within the porous structure of the porous base substrate, the problem of layer peeling or the like can be prevented.

Further, the inventors of the present invention have attained a composite film obtained by impregnating a porous base substrate with a monomer mixture containing a vinyl compound having a functional group and a crosslinking monomer and thereafter causing photopolymelization.

The present invention has been completed based on these findings.

The present invention provides a battery diaphragm formed of a composite film including a complex of a porous base substrate (A) with a crosslinked polymer ($B_1$) containing repeated units of vinyl heterocyclic compound having two or more hydrophilic groups.

Further, the present invention provides a battery diaphragm including a complex of a porous base substrate (A) with a crosslinked polymer ($B_2$) containing repeated units of vinyl compound each having a functional group, and thereafter decomposing part of the functional groups.

Further, the present invention provides a battery diaphragm formed of a composite film including a complex of a porous base substrate (A) with a crosslinked polymer ($B_3$) containing repeated units of vinyl compound each having a functional group, wherein the complex of the porous base substrate (A) with the crosslinked polymer is prepared by impregnating porous structure of the porous base substrate (A) with a monomer mixture containing the vinyl compound having functional groups and a crosslinking monomer and causing photopolymerization to generate the crosslinked polymer ($B_3$) in the porous structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention will be described in detail in the following.

The porous base substrate (A) used in the present invention may be a porous body employing a material having superior chemical resistance including, for example: polyolefin such as polyethylene or polypropylene; and fluorine plastic such as polyvinylidine fluoride, polytetrafluoroethylene, hexafluoropropylene/tetrafluoroethylene copolymer or perfluoropropyl vinyl ether/tetrafluoroethylene copolymer. Such a porous base substrate may be a porous film formed to have porous structure by drawing method or hole forming method, and a non-woven fabric having porous structure between fibers.

Among these porous base substrates, polytetrafluoroethylene porous film is the most suitable porous base substrate having superior chemical resistance and good processability. The polytetrafluoroethylene porous film used in the present invention may be suitably manufactured by the drawing method described, for example, in Japanese Patent Publication No. 42-13560. More specifically, first, fine powder of polytetrafluoroethylene is mixed with a lubricant, and preformed to have the shape of a sheet or a tube by extrusion, rolling or the like. The preform is drawn at least in one direction with the lubricant removed or not removed. By this drawing, the fine powder particles of the polytetrafluoroethylene are separated, resulting in crack-like pores where very fine fibers like threads are formed extending in the direction of drawing, whereby a porous structure including knots and fibers is formed.

Thereafter, the resulting drawn body is fixed to prevent shrinkage and heated to a temperature not lower than the melting point of polytetrafluoroethylene so as to sinter and fix the drawn structure. Thus, a polytetrafluoroethylene porous film having improved strength is obtained. The diameter of pores of the porous base substrate used in the present invention is generally in the range of 0.05 to 5 $\mu$m and preferably 0.2 to 3 $\mu$m. Porosity is generally 60 to 90% and preferably 70 to 85%, and the thickness is generally 10 to 100 $\mu$m and preferably 20 to 60 $\mu$m.

In the present invention, in order to manufacture a crosslinked polymer ($B_1$) containing repeated units of vinyl heterocyclic compound having two or more hydrophylic groups, generally, a monomer mixture containing a crosslinking monomer and a vinyl heterocyclic compound having two or more hydrophilic groups is used. The monomer mixture may contain other vinyl monomer allowing copolymerization.

The vinyl heterocyclic compound having two or more hydrophylic groups used in the present invention may be a vinyl derivative of heterocyclic compound containing two or more hydiophylic groups such as an amino group or a ketone group in the molecule. More specifically, such a vinyl heterocyclic compound includes, for example: 1-vinyl pyrrolidone (that is, N-vinyl-2-pyrrolidinone); and vinyl imidazoles such as 1-vinyl imidazole, 2-vinyl imidazole and 4-vinyl imidazole. Among these, 1-vinyl imidazole and 1-vinyl pyrrolidone are most preferable in view of physical properties as a battery diaphragm and radical polymerization reactivity.

In the present invention, a crosslinking monomer is used to obtain a crosslinked polymer. The crosslinking monomer may be a polyfunctional monomer having two or more carbon-carbon double bonds. In view of adjustability of the degree of crosslinking and physical property as an ion exchange resin, generally, divinyl benzene is preferably used.

In the present invention, in order to enhance polymerization reactivity and to improve physical properties of the battery diaphragm, a vinyl monomer allowing copolymerization with a crosslinking monomer or a vinyl heterocyclic compound having two or more hydrophilic groups may be used. Such a vinyl monomer may include, for example: styrene derivatives such as styrene, vinyltoluene and α-methylstyrene; and vinylpyridine derivatives such as 2-vinylpyridine and 4-vinylpyridine. Among these, 4-vinylpyridine is most preferable in view of polymerization reactivity and physical properties.

In the present invention, among the combinations of monomers mentioned above, the combinations of 1-vinyl imidazole/4-vinylpyridine/divinyl benzene and 1-vinyl pyrrolidone/4-vinylpyiidine/divinyl benzene are most preferable, in view of polymerization reactivity, mechanical strength and the balance between ion permeability and low resistance. In a conventionally known 4-vinylpyridine/divinyl benzene copolymer, when the ratio of divinyl benzene is increased to attain higher degree of crosslinking so as to improve ion permeability of the battery diaphragm, the number of hydiophylic groups in the ion exchange membrane decreases, resulting in higher resistance. By contrast, when part of 4-vinylpyridine is replaced by 1-vinyl imidazole or 1-vinyl pyrrolidone, the number of hydrophylic groups in the ion exchange membrane is not much reduced but rather, in some cases, increased, even if the ratio of divinyl benzene is increased, as 1-vinyl imidazole has two amine groups in the heterocycle and 1-vinyl pyrrolidone has one amine group and one carbonyl group in the heterocycle. When the number of hydrophylic groups is large, it becomes easier to hold much water in the battery diaphragm, and hence, lower resistance can be attained.

Such function and effect can be attained by any vinyl heterocyclic compound having two or more hydrophylic groups other than imidazole and 1-vinylpyrrolidone. From the above described reasons, however, 1-vinyl imidazole and 1-vinyl pyrrolidone are most preferable. The amine group included in 1-vinyl imidazole turns to a cation in an acid solution. The metal cation in an acid solution tends to pass through the battery diaphragm when there is generated a potential difference. However, the metal cation is electrically repulsed by the cation at a surface layer of the diaphragm. Therefore, the metal cation having large ion diameter and large amount of charges cannot pass through the diaphragm. By contrast, hydrogen ion is a monovalent cation having small ion diameter and hence it is easily diffused and passed through the diaphragm having cations, resulting in lower resistance.

As described above, 1-vinyl imidazole having two amine groups enables improved ion selective permeability. To attain such a function efficiently, the ratio by weight of 1-vinyl imidazole, 4-vinylpyridine and divinyl benzene in the monomer mixture should preferably be 1–60:20–80:10–50 (wt %). The polymerization reaction may be attained by general radical reaction using an organic peroxide or the like as an initiator. Alternatively, the polymerization reaction may be attained by photopolymerization using a photopolymerization catalyst.

As compared with 1-vinyl imidazole having two amine groups, the effect of electrical repulsion at the surface layer of the diaphragm is a little lower when 1-vinyl pyrrolidone is used, as 1-vinyl pyrrolidone has one amine group. However, a battery diaphragm having sufficient effect can be provided. The weight ratio of 1-vinyl pyrrolidone, 4-vinylpyridine and divinyl benzene in the monomer mixture should preferably be 20–60:20–60:10–50 (wt %). As described above, polymerization reaction may be attained by radical reaction using an organic peroxide or the like as an initiator. Alternatively, the polymerization reaction can also be attained by photopolymerization.

In the present invention, in order to manufacture a crosslinked polymer ($B_2$) containing repeated units of vinyl compound each having a functional group, a monomer mixture containing a crosslinking monomer and the vinyl compound having functional groups is used. In order to decompose part of the functional groups after formation of the complex including the crosslinked polymer ($B_2$), a vinyl compound having two or more types of functional groups may be used. Preferably, the monomer mixture should desirably contain both a vinyl compound having an anion-exchange group and a vinyl compound having a hydrolyzable functional group.

The vinyl compound having anion-exchange group used in the present invention may include, for example: pyridines such as 2-vinylpyridine and 4-vinylpyiidine; vinyl imidazoles such as 1-vinyl imidazole, 2-vinyl imidazole and 4-vinyl imidazole; and 1-vinyl pyrrolidone.

The vinyl compound having a hydrolyzable functional group may include: esters such as vinyl acetate, vinyl propionate, vinyl-n-butyrate, vinyl methacrylate, ethyl acrylate, n-propyl acrylate and hydroxyethyl metacrelate; nitrites such as acrylonitrile; amides such as acrylamide; ketones; and derivatives thereof.

A crosslinking monomer is used to obtain the crosslinked polymer ($B_1$). A polyfunctional monomer having two or more carbon-carbon double bonds may be used as the crosslinking monomer. Generally, divinyl benzene is preferably used as the crosslinking monomer, in view of adjustability of the degree of crosslinking and physical properties as an ion exchange resin.

As the monomer mixture containing a vinyl compound having anion-exchange group, a vinyl compound having a hydrolyzable functional group and a crosslinking monomer, a selected combination of those listed above may be possible. In view of polymerization reactivity, mechanical strength and the balance between ion permeability and low resistance, combination ① of 4-vinylpyryridine, vinyl acetate and divinyl benzene, combination ② of 4-vinylpyridine, vinyl propionate and divinyl benzene, and combination ③ of 4-vinylpyridine, vinyl-n-butyrate and divinyl benzene are preferable.

When the 4-vinylpyridine/vinyl acetate/divinyl benzene copolymer, 4-vinylpyridine/vinyl propionate/divinyl benzene copolymer, or 4-vinylpyridine/vinyl-n-butyrate/divinyl benzene copolymer is simply used and the degree of crosslinking is increased by increasing the ratio of divinyl benzene, hydrophlicity in the ion exchange membrane lowers, increasing resistance. After polymerization, however, hydrolysis of acetate group in the repeated units of vinyl acetate, propionate group in the repeated units of vinyl propionate and n-butyrate group in the repeated units of vinyl-n-butyrate generates hydroxyl group, which improves hydrophlicity and provides spaces in the crosslinked polymer, making it easier to hold water molecules and to attain low resistance.

Such function and effect can be attained by a combination of a vinyl compound having an anion-exchange group, a vinyl compound having a hydrolyzable functional group and a crosslinking monomer. From the above described reasons, combination ① of 4-vinylpyiidine/vinyl acetate/divinyl benzene, combination ② of 4-vinylpyridine/vinyl propionate/divinyl benzene and combination ③ of 4-vinylpyridine/vinyl-n-butyrate/divinyl benzene are especially preferable. The amino group contained in 4-vinylpyridine turns to a cation in an acid solution. The metal cation in the acid solution tends to pass through the battery diaphragm when a potential difference is generated. However, the metal cation is electrically repulsed by the cations on the surface layer of the diaphragm. Therefore, the metal cation having large ion diameter and large amount of charges cannot pass through the diaphragm.

By contrast, hydrogen ion is a monovalent cation having small ion diameter, and therefore it can be easily diffused and permeated through the diaphragm having cations. When there are spaces in the crosslinked polymer, it becomes easier for water molecules to exist therein, and hence passage of hydrogen ions is further facilitated. In order to attain the high hydrophilicity after hydrolysis and the function of providing spaces in the crosslinked polymer efficiently, the weight ratio of ① 4-vinylpyridine, vinyl acetate and divinyl benzene, ② 4-vinylpyridine, vinyl propionate and divinyl benzene and ③ 4-vinylpyridine, vinyl-n-butyrate and divinyl benzene in the monomer mixture should desirably be in the range of 50–80:1–30:10–50 (wt %). The polymerization reaction may be attained by general radical reaction. Alternatively, thermal polymerization or photopolymerization may be utilized.

As to the method of preparing a complex of the porous base substrate (A) with the crosslinked polymer ($B_1$) or ($B_2$)

as the ion exchange resin, the following methods may be possible, for example. (1) A method in which a crosslinked polymer is synthesized in advance, and the porous structure of the porous base substrate is impregnated with the crosslinked polymer and the crosslinked polymer is fixed, and (2) the porous structure of the porous base substrate is impregnated with the monomer mixture, and the mixture is polymerized in the porous structure.

Of these methods, the method of preparing a complex of the porous base substrate with the crosslinked polymer in which the porous structure of the porous base substrate is impregnated with a monomer mixture containing a crosslinking monomer and a vinyl heterocyclic compound having two or more hydrophilic groups, the mixture is polymerized, and crosslinked polymer ($B_1$) is generated in the porous structure is preferred. Similarly, a method of preparing a complex of the porous base substrate with the crosslinked polymer in which the porous structure of the porous base substrate is impregnated with a monomer mixture containing a vinyl compound having functional groups and a crosslinking monomer, the mixture is polymerized and the crosslinked polymer ($B_2$) is generated in the porous structure is preferable.

According to the method of polymerizing the monomer mixture in the porous structure, bonding between the wall surface of the porous structure and the crosslinked polymer is made strong. Especially when the porous structure of polytetrafluroethylene porous film formed by drawing is impregnated with a monomer compound and the monomer compound is polymerized, long chain polymerized polymer is polymerized tangling with the fine fibers of the polytetrafluroethylene porous film, and therefore bonding between the porous base substrate and the ion exchange resin (crosslinked polymer) is extremely strong.

The monomer mixture may be polymerized in the porous structure by thermal polymerization, photopolymerization or the like. Thermal polymerization and photopolymerization, however, provide different structures of crosslinked polymers, because of difference in the rate of polymerization. Generally, polytetrafluroethylene is said to have poor photo transmittance. Polymerization of the monomer mixture, however, proceeds easily in a porous structure of a polytetrafluroethylene porous film having porosity of 60 to 90% and the thickness of 10 to 100 μm, and preferably having the porosity of 70 to 85% and the thickness of 20 to 60 μm, and a battery diaphragm having higher ion selective permeability and lower resistance than that prepared by thermal polymerization can be formed.

The aromatic polysulfone type polymer described in Japanese Patent Laying-Open No. 6-271688 mentioned above does not allow polymerization in the wall of the porous base substrate, as the polymerization reaction proceeds by condensation polymerization. By contrast, the crosslinked polymer of the present invention allows reaction in the wall of the porous base substrate, as the reaction is vinyl type monomer adding polymerization reaction. Further, it is possible to provide the function as an ion exchange membrane (that is, battery diaphragm) without clogging the porous structure of the porous base substrate by appropriately adjusting the amount of monomer mixture used.

Specific Embodiment 1

The present invention will be described in detail in the following with reference to examples and comparative examples. It should be noted that the present invention is not limited to the specific embodiments described in the following.

EXAMPLE 1

Forty wt % of 4-vinylpyridine (manufactured by Tokyo Kasei Kogyo Co., Ltd.) distilled under reduced pressure, 40 wt % of 1-vinyl imidazole (manufactured by Tokyo Kasei Kogyo Co., Ltd.) and 20 wt % of divinyl benzene (manufactured by Wakou Junnyaku Kogyo Co., Ltd.) are mixed, and benzoyl peroxide (manufactured by Kayaku Akuzo Company, Cadox B-CH50) is added by the ratio of 3.5 wt % of the total amount of these monomers and dissolved, whereby a monomer mixture was prepared.

Porous structure of drawn polytetrafluoroethylene porous film (Sumitomo Electric Industries, Ltd., WP-045-40; pore diameter=0.45 μm, porosity=80%, thickness=40 μm) was impregnated with the monomer mixture, excessive monomer mixture on the film surface was removed, polytetrafluoroethylene sheets are applied on opposing surfaces of the substrate, and polymerization was performed for six hours in a thermostat at 80° C. After the completion of polymerization, drying for four hours at 100° C. was performed, and thus a battery diaphragm was obtained.

EXAMPLE 2

Thirty wt % of 1-vinyl pyrrolidone (Tokyo Kasei Kogyo Co., Ltd.), 50 wt % of 4-vinylpyridine and 20 wt % of divinyl benzene are mixed, benzoyl peroxide of 3.5 wt % of the total of these monomers was added and dissolved, and thus a monomer mixture was prepared. Except that this monomer mixture was used, the same operation as in Example 1 was conducted, and a battery diaphragm was obtained.

EXAMPLE 3

Seventy wt % of 4-vinylpyridine (Tokyo Kasei Kogyo Co., Ltd.) distilled under reduced pressure, 10 wt % of vinyl acetate (Tokyo Kasei Kogyo Co., Ltd.) and 20 wt % of divinyl benzene (Wakou Junnyaku Kogyo Co., Ltd.) were mixed, and phenyl bis (2,4,6-trimethyl benzoyl) phosphine oxide (Chiba Speciality Chemicals, Irgacure 819) of 5 molar % of the total of these monomers was added and dissolved, and thus a monomer mixture was prepared.

Porous structure of drawn polytetrafluoroethylene porous film (Sumitomo Electric Industries, Ltd., WP-045-40; pore diameter=0.45 μm, porosity=80%, thickness=40 μm) was impregnated with the monomer mixture, excessive monomer mixture adhered on the film surface was removed, and tetrafluoroethylene-hexafluoropropylene sheets were applied on opposing sides, polymerization was conducted by irradiating the resulting body with UV light of 2 kW for two minutes, and a composite film was obtained. The resulting composite film was immersed in 1M sodium hydroxide solution at a room temperature for 24 hours, washed by water, and thus a battery diaphragm was obtained.

EXAMPLE 4

Seventy wt % of 4-vinylpyridine (Tokyo Kasei Kogyo Co., Ltd.) distilled under reduced pressure, 10 wt % of vinyl-n-butyrate (Tokyo Kasei Kogyo Co., Ltd.) and 20 wt % of divinyl benzene (Wakou Junnyaku Kogyo Co., Ltd.) were mixed, and phenyl bis(2,4,6-trimethyl benzoyl) phosphine oxide (Chiba Speciality Chemicals, Irgacure 819) of 5 molar % of the total of these monomers was added and dissolved, and thus a monomer mixture was prepared. Except that this monomer mixture was used, the same operation as Example 3 was conducted, and a battery diaphragm was obtained.

EXAMPLE 5

Seventy wt % of 4-vinylpyridine (Tokyo Kasei Kogyo Co., Ltd.), 5 wt % of 1-vinyl imidazole (Tokyo Kasei Kogyo Co., Ltd.) and 25 wt % of divinyl benzene (Wakou Junnyaku Kogyo Co., Ltd) were mixed, phenyl bis (2,4,6-trimethyl benzoyl) phosphine oxide (Chiba Speciality Chemicals, Irgacure 819) of 5 molar % of the total of these monomers was added and dissolved, and thus a monomer mixture was prepared. Except that this monomer mixture was used, the same operation as Example 3 was conducted, and a battery diaphragm was obtained.

EXAMPLE 6

Seventy-four wt % of 4-vinyl pyridine (Tokyo Kasei Kogyo Co., Ltd.) distilled under reduced pressure, and 26 wt % of divinyl benzene (Wakou Junnyaku Kogyo Co., Ltd.) were mixed, phenyl bis(2,4,6-trimethyl benzoyl) phosphine oxide (Chiba Speciality Chemicals, Irgacure 819) of 5 molar % of the total of these monomers was added and dissolved, and thus a monomer mixture was prepared. Except that this monomer mixture was used, the same operation as Example 3 was conducted, and a battery diaphragm was obtained.

Comparative Example 1

Ninety-five wt % of 4-vinylpyridine distilled under reduced pressure and 5 wt % of divinyl benzene were mixed, and benzoyl peroxide of 3.5 wt % of the total of these monomers was added and dissolved, and thus a monomer mixture was prepared. Except that this monomer mixture was used, the same operation as Example 1 was conducted, and a battery diaphragm was obtained.

Comparative Example 2

Eighty wt % of 4-vinylpyiidine distilled under reduced pressure and 20 wt % of divinyl benzene were mixed, and benzoyl peroxide of 3.5 wt % of the total of these monomers was added and dissolved, and thus a monomer mixture was prepared. Except that the monomer mixture was used, the same operation as Example 1 was conducted, and a battery diaphragm was obtained.

<Performance Test>

The following experiments were conducted on the battery diaphragms prepared in accordance with the examples of the Specific Embodiment 1 of the present invention and Comparative Examples 1 and 2.

(1) Diffusibility of $VO^{2+}$ ions

Two containers are brought into contact with each other with respective battery diaphragms each having the area of 1.5 $cm^2$ interposed therebetween. 1M VOSO4 and ion-exchanged water of 40 ml and 60 ml, respectively, were put into the containers, stirred for one hour and left as they are. Concentration of $VO^{2+}$ ions of the resulting ion-exchanged water was measured, and diffusibility through the diaphragms was evaluated.

(2) Internal Resistance

Two electrodes are arranged with a distance of 2.2 mm with each of the battery diaphragms having the area of 9.0 $cm^2$ interposed, a current of 100 MA/$cm^2$ was conducted, and internal resistance was calculated based on the voltage value at that time. The results of these evaluations are as shown in Table 1 below.

TABLE 1

|  | Concentration of moved $VO^{+2}$ ions (mol) | Internal Resistance ($\Omega$) |
| --- | --- | --- |
| Embodiment 1 | $1.1 \times 10^{-4}$ | 1.4 |
| Comparative Example 1 | $2.9 \times 10^{-4}$ | 1.7 |
| Comparative Example 2 | $7.5 \times 10^{-5}$ | 2.0 |

As is apparent from the results of Table 1, the battery diaphragm in accordance with the embodiment of the present invention employing 1-vinyl imidazole as a monomer component has extremely low internal resistance and, nevertheless, it has superior ion selective permeability. Therefore, it is apparent that the battery diaphragm of the present embodiment is superior.

The following experiment was conducted on respective battery diaphragms prepared in accordance with Examples 1 to 6 and Comparative Examples 1 and 2.

(3) Current Efficiency and Voltage Efficiency

Respective battery diaphragms were used as diaphragms of redox flow batteries each employing sulfuric acid solution of $V^{5+}/V^{4+}$ as positive electrolyte and sulfuric acid solution of $V^{2+}/V^{3+}$ as negative electrolyte, charging/discharging operation was performed, and current efficiency and voltage efficiency were measured. The results are as shown in Table 2.

TABLE 2

|  | Current Efficiency (%) | Voltage Efficiency (%) |
| --- | --- | --- |
| Example 1 | 98.1 | 81.4 |
| Example 2 | 98.0 | 79.8 |
| Example 3 | 98.9 | 81.2 |
| Example 4 | 97.9 | 83.8 |
| Example 5 | 98.7 | 82.1 |
| Example 6 | 99.0 | 80.9 |
| Comparative Example 1 | 95.7 | 81.1 |
| Comparative Example 2 | 98.9 | 74.0 |

As is apparent from the results of Table 2, the battery diaphragms in accordance with Examples 1 and 5 using 1-vinyl imidazole as the monomer component and the battery diaphragm in accordance with Example 2 using 1-vinyl pyrrolidone have both high current efficiency and high voltage efficiency, and it is apparent that these are superior as battery diaphragms. The battery diaphragm in accordance with Example 3 obtained by polymerizing vinyl acetate as the monomer component followed by hydrolysis and the battery diaphragm in accordance with Example 4 obtained by polymerizing vinyl-n-butyrate followed by hydrolysis also had both high current efficiency and high voltage efficiency and it is apparent that these are also superior as battery diaphragms. Further, the battery diaphragm in accordance with Example 6 formed by photopolymerization has both high current efficiency and high voltage efficiency, and it is apparent that the diaphragm is superior as a battery diaphragm.

As described above, according to the present invention, a battery diaphragm having superior chemical resistance, high mechanical strength and superior ion selective permeability and low resistance, especially a battery diaphragm suitable as a diaphragm of a secondary battery such as an alkaline battery and a redox flow battery is obtained which consists of a composite film including a complex of a porous base substrate with a crosslinked polymer functioning as an ion exchange resin.

Although the present invention has been described and illustrated in detail, it is clearly understood that the same is by way of example only and is not to be taken by way of limitation, the spirit and scope of the present invention being limited only by the terms of the appended claims.

What is claimed is:

1. A battery diaphragm formed of a composite film comprising a complex of a porous base substrate with a crosslinked copolymer, the crosslinked copolymer is prepared by impregnating a porous structure of the porous base substrate with a monomer mixture comprising a crosslinking monomer and at least one vinyl compound having functional groups, and causing polymerization to generate the crosslinked copolymer in the porous structure.

2. The battery diaphragm according to claim 1, wherein the crosslinked polymer contains repeated units of a vinyl heterocyclic compound having at least two hydrophilic groups.

3. The battery diaphragm according to claim 2, wherein the porous base substrate is a polytetrafluoroethylene porous film.

4. The battery diaphragm according to claim 2, wherein the heterocyclic compound is at least one compound selected from the group consisting of 1-vinylpyrrolidone and vinyl imidazoles.

5. The battery diaphragm according to claim 4, wherein the porous base substrate is a polytetrafluoroethylene porous film and the monomer mixture comprises 1-vinyl imidazole, 4-vinyl pyridine and divinyl benzene.

6. The battery diaphragm according to claim 5, wherein the monomer mixture contains 1 to 60 wt % of 1-vinyl imidazole, 20 to 80 wt % of 4-vinyl pyridine, and 10–50 wt % of divinyl benzene.

7. The battery diaphragm according to claim 4, wherein the porous base substrate is a polytetrafluoroethylene porous film and the monomer mixture comprises 1-vinyl pyrrolidone, 4-vinyl pyridine and divinyl benzene.

8. The battery diaphragm according to claim 7, wherein the monomer mixture contains 20 to 60 wt % of 1-vinyl pyrrolidone, 20 to 60 wt % of 4-vinyl pyridine, and 10 to 50 wt % of divinyl benzene.

9. The battery diaphragm according to claim 1, wherein the crosslinked copolymer contains a vinyl compound having a hydrolyzable functional group, and thereafter, hydrolysis of hydrolyzable functional group and generation of hydroxyl group after polymerization.

10. The battery diaphragm according to claim 9, wherein the porous base substrate is a polytetrafluoroethylene porous film.

11. The battery diaphragm according to claim 9, wherein the crosslinked copolymer contains a vinyl compound having a hydrolyzable functional group and a vinyl compound having an anion-exchange group.

12. The battery diaphragm according to claim 9, wherein the monomer contains 4-vinyl pyridine, vinyl acetate and divinyl benzene.

13. The battery diaphragm according to claim 12, wherein the monomer mixture contains 50 to 80 wt % of 4-vinyl pyridine, 1–80 wt % of vinyl acetate, and 10–50 wt % of divinyl benzene.

14. The battery diaphragm according to claim 9, wherein the monomer mixture contains 4-vinyl pyridine, vinyl propionate or vinyl-n-butyrate, and divinyl benzene.

15. The battery diaphragm according to claim 14, wherein the monomer mixture contains 50 to 80 wt % of 4-vinyl pyridine, 1–30 wt % of vinyl propionate or vinyl-n-butyrate, and 10 to 50 wt % of divinyl benzene.

16. The battery diaphragm according to claim 1, wherein the crosslinked copolymer is generated by photopolymerization.

17. The battery diaphragm according to claim 16, wherein the base substrate is a polytetrafluoroethylene porous film.

18. The battery diaphragm according to claim 17, wherein the polytetrafluoroethylene porous film as the porous base substrate has a porosity of 70 to 85% and a thickness of 20 to 60 μm.

19. The battery diaphragm according to claim 16, wherein the vinyl compound of the crosslinked copolymer is a vinyl compound having an anion-exchange group.

* * * * *

UNITED STATES PATENT AND TRADEMARK OFFICE
CERTIFICATE OF CORRECTION

PATENT NO. : 6,461,772 B1
DATED : October 8, 2002
INVENTOR(S) : Shinichi Miyake et al.

It is certified that error appears in the above-identified patent and that said Letters Patent is hereby corrected as shown below:

Column 11,
Line 20, replace "polymer" with -- copolymer --

Signed and Sealed this

First Day of April, 2003

JAMES E. ROGAN
*Director of the United States Patent and Trademark Office*